United States Patent
Dougherty et al.

(10) Patent No.: US 6,370,575 B1
(45) Date of Patent: *Apr. 9, 2002

(54) WEB-BASED STATUS/ISSUE TRACKING SYSTEM BASED ON PARAMETERIZED DEFINITION

(75) Inventors: W. David Dougherty, Round Rock; Steve F. Hejl, Pflugerville; Louis R. Stott, Austin, all of TX (US)

(73) Assignee: Advanced Micro Devices, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/227,386

(22) Filed: Jan. 8, 1999

(51) Int. Cl.7 .............................................. G06F 13/00
(52) U.S. Cl. ...................... 709/224; 709/206; 709/219; 709/329; 707/104
(58) Field of Search ................................ 709/204, 205, 709/206, 217, 219, 223, 224, 313, 318, 328, 329; 707/10, 104

(56) References Cited

U.S. PATENT DOCUMENTS

| | | | | |
|---|---|---|---|---|
| 5,793,365 A | * | 8/1998 | Tang et al. | 345/329 |
| 5,862,346 A | * | 1/1999 | Kley et al. | 709/245 |
| 5,870,558 A | * | 2/1999 | Branton, Jr. et al. | 709/224 |
| 5,893,074 A | * | 4/1999 | Hughes et al. | 705/8 |
| 5,999,911 A | * | 12/1999 | Berg et al. | 705/9 |
| 6,044,368 A | * | 3/2000 | Powers | 707/2 |
| 6,161,113 A | * | 12/2000 | Mora et al. | 707/505 |
| 6,212,549 B1 | * | 4/2001 | Page et al. | 709/205 |
| 6,223,177 B1 | * | 4/2001 | Tatham et al. | 707/9 |

OTHER PUBLICATIONS

*HTML "Forms" PC Lube and Tune*, Distributed Applications and the Web, H. Gilbert, Jan. 1997, pp. 1–3.
*GGI.pm—a Perl5 GGI Library*, "Cold Spring Harbor Laboratory" L. Stein, Version 2.42, Jun. 8, 1998, pp. 1–68.
*Siebel InterActive*, www.siebel.com/products–solutions/si_int.html, Jan. 13, 1999, pp. 1–2.

* cited by examiner

Primary Examiner—Viet D. Vu
(74) Attorney, Agent, or Firm—Akin, Gump, Strauss, Hauer, & Feld LLP

(57) ABSTRACT

A web-based tool is provided for unifying submission of reports and other communications between disciplines of an organization. The tool provides weekly reports, submissions by discipline and issue, and automatic report creation, with email notification to management team members. A flexible scheme allows deployment on multiple projects without significant changes in software, because of its parameterized design.

20 Claims, 12 Drawing Sheets

Microfiche Appendix Included
(1 Microfiche, 17 Pages)

PROJECT Team Status

*102* — Reports from: Joe Manager
☐ Milestones, Stock Status, and Deliverables

*104* — Agenda Item Submission
Summary Report Selection: [LATEST ▼] [SUBMIT]

*116* — Status Report Submission
Select Department / Person making submission: [SELECT ▼] [SUBMIT]
Please format your report to fit horizontally in the window below

*118* — Agenda Item Submission
Select Department / Person making submission: [DESIGN ▼] [SUBMIT]

*120* — Issue Submission
Select Department / Person making submission: [DESIGN ▼]
Send Email To:
[person@xyzcompany.com]
Issue Owned by: [DESIGN ▼]
Issue Priority: [LOW ▼]
Summary
Detailed Description

*110* — Open Issue Viewer    Closed Issue Viewer
☐   (00000) Synchronization of Stack and Top Level Netlists
    (00000) CLOSED: Synchronization of Stack and Top Level Netlists ☒ Email the webmaster          ☒

Project Definition File:

>Priority_label: Issue Priority
>Priority_options: Low Medium High

>agenda_flag: 1

>email_CAD: Otto.Cad@bigcompany.com
>email_Design: Emily.Engineer@bigcompany.com
>email_Layout: Layla.Layout@bigcompany.com
>email_Marketing: Sam.Sales@bigcompany.com
>email_ProductTest: Tim.Tester@bigcompany.com
>email_SystemEng-HW: Todd.Transistor@bigcompany.com
>email_SystemEng-SW: Carrie.Compiler@bigcompany.com
>email_TechPubs: Wally.Writer@bigcompany.com >issues_dir: data/issues
>issues_display: 5
>issues_selfields: Priority
>issues_textfields:

>mail_group: project_core@bigcompany.com
>mail_include: include.html
>maintainer: Fred.Fixer@bigcompany.com >no_report_flag: 1

>people: Design Verification Validation Layout TechPubs ProductTest Marketing CAD >report:         data/970721.shtml    data/970728.shtml
data/970804.shtml   data/970811.shtml    data/970818.shtml
data/970825.shtml   data/970901.shtml    data/970908.shtml
data/970915.shtml   data/970922.shtml    data/970929.shtml
data/971006.shtml   data/971013.shtml    data/971020.shtml
data/971027.shtml   data/971103.shtml    data/971110.shtml
data/971117.shtml   data/971124.shtml    data/971201.shtml
data/971208.shtml   data/971215.shtml    data/971229.shtml
data/980105.shtml   data/980112.shtml    data/980119.shtml
data/980126.shtml   data/980202.shtml    data/980209.shtml
data/980216.shtml >status_flag: 1

>title: Project Team Status

Issue Submission

Select Department or
Person making submission — 260

[SELECT ▼]
- DESIGN
- VERIFICATION
- VALIDATION
- LAYOUT
- TECHPUBS — 262
- PRODUCT TEST
- MARKETING
- CAD

Send Email to: — 276

[project@bigcompany.com]

Issue owned by: — 264

[SELECT ▼]
- DESIGN
- VERIFICATION
- VALIDATION
- LAYOUT
- TECHPUBS — 266
- PRODUCT TEST
- MARKETING
- CAD

Issue priority: — 268

[LOW ▼]
- LOW — 270
- MEDIUM
- HIGH

Summary of issue:

[__________] — 272

Detailed description of issue: — 274

[__________]

278
[Submit]

PROJECT   Team Status – Issue #00001

Other postings on this issue:
- CLOSING: Synchronization of Block and Top Level Netlists
  by Design August 29 1997 11:08:47

Issue Submitted: July 16 1997 by Layout

Issue Owned by: Design

Issue Priority: High

Summary:
  Synchronization of Block and Top Level Netlists

Issue:
  Beginning with the "First Pass" release of netlists and related files, the top

Status: Issue is CLOSED

Email the webmaster   Back to Serrano Core Team Status Main Panel

*FIG. 12*

WEB-BASED STATUS/ISSUE TRACKING SYSTEM BASED ON PARAMETERIZED DEFINITION

MICROFICHE APPENDIX

A microfiche appendix, consisting of 17 frames on 1 sheet is attached hereto and incorporated herein in its entirety.

BACKGROUND OF THE INVENTION

1. Field of the Invention

The invention relates to periodic information management in medium to large organizations of people, and, more particularly to a web-based interactive system for efficiently and effectively managing communications between organization members.

2. Description of the Related Art

When different organizations within a company are involved in a common project, these organizations typically need to communicate with one another. Communication between managers may be effective for some projects, while other projects may require interaction between lower-level employees. As companies and projects grow in size, the number and size of organizations involved may increase as well. In today's global market, the ability of a company to compete may hinge upon quickly adapting to different project requirements, organizational changes, and other unforeseen changes to the company. Thus, a system for managing communication between organizations of a company is desirable.

SUMMARY OF THE INVENTION

A system according to the invention includes a web-based status and issue tracking system for use by multiple departments of an organization or project. The system is made up of a variety of functions based upon parameterized definitions. For simplicity, the system is known as SIS, for status and issue tracking system.

As a status and issue tracking system, SIS provides status to all members of the organization. In one embodiment, SIS uses a web page for its interface. The web page is on a web site on a network server, such as the Internet or on a workstation that is available to members of the organization or project. Such an environment is ideally suited for providing status information because of the volume of information being collected and displayed, the interactive nature of web pages, and the ease of use and understanding of web pages.

As part of the SIS definition, the organization or project is divided into departments or disciplines. Preferably, a manager for each discipline is assigned. This manager may also act as a contact liaison for issues assigned to a particular discipline.

SIS acts as a report collector and generator. The system provides a mechanism for periodic report submissions from the manager of each discipline. The format for these reports is flexible and may include embedded HTML code, as desired. SIS combines these report submissions as a summary report at a predetermined time. The summary report is either sent to the manager of each discipline, or, alternatively, posted on a designated web site. Preferably, an email modification of such posing is sent to each manager. In addition to viewing the summary report, archival summary reports may be retrieved from the web site. An easy-to-use interface is provided for all retrievals from the web site.

SIS also acts as a receipt mechanism. SIS allows agenda items for interdepartmental meetings to be submitted to the web site. Again, by providing a user-friendly interface on the web site, all or selected members of the organization can submit proposals to be considered for future interdepartmental meetings.

SIS further provides a comprehensive issue submission and tracking system. Issues may be submitted to the web site, again through a friendly interface. Each issue is preferably submitted according to the department or discipline that originates the issue. Upon submission, email notification of relevant parties is possible. Ownership of issues may be assigned, either to a person or a discipline, as needed. Issue priority may also be designated.

For viewing current and closed issues, SIS provides an interface that allows retrieval either by issue number or issue description. Alternatively, all issues assigned to a particular person or discipline may be retrieved. Thus, issue tracking by discipline is possible.

The SIS system is flexible. Each function of the web-based user interface is based upon a parameterized definition contained in a project definition file. Enhancements can readily be made to accommodate the special requirements of an organization, or for different projects within the organization. This allows SIS to be easily reconfigured on a project-by-project basis.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

This application is related to commonly assigned U.S. patent application Ser. No. 09/132,929, entitled "DYNAMIC FORM GENERATOR FOR WORLD WIDE WEB-BASED DATA MANAGEMENT," which is hereby incorporated by reference for all purposes as if set forth in its entirety.

Figure 1:
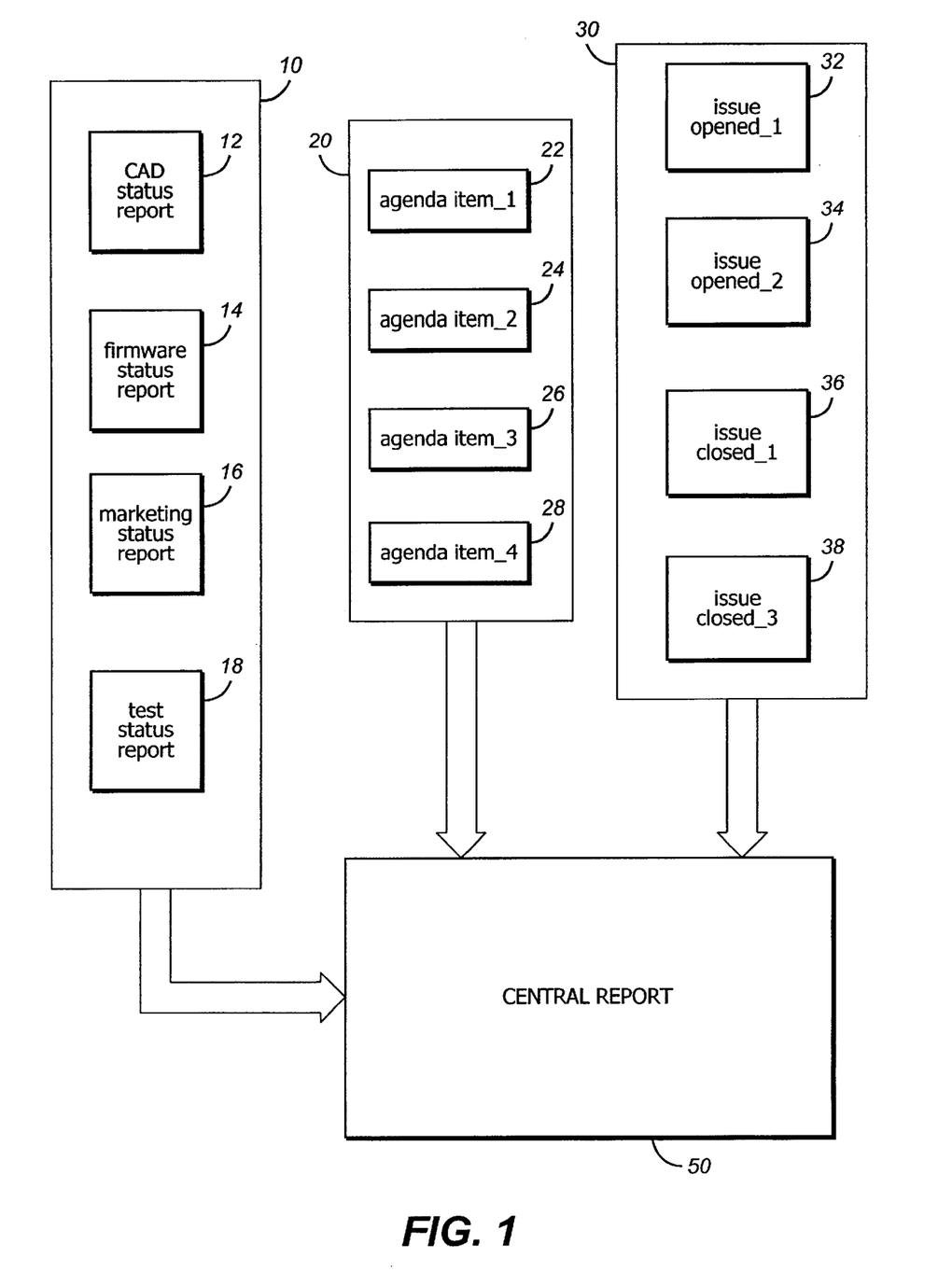
FIG. 1 is a block diagram of typical communication that takes place between departments within an organization.

FIG. 1 is block diagram illustrating typical communication that often take place between departments or disciplines within an organization, especially in conjunction with a project. The remainder of the discussion focuses on an integrated circuit design project, but a manager or programmer can adapt the disclosed systems to a wide variety of other projects. Block diagrams showing status reports 10 are illustrated, including computer aided design (CAD) status report 12, firmware status report 14, marketing status report 16, and test status report 18 as a few examples. These reports typically occur periodically such as weekly, bimonthly, etc., and typically include any type of status that is relevant to a project or that should be communicated between members of different disciplines.

Also shown in FIG. 1 are agenda items 20 submitted by organization members, including agenda item_1 22, agenda item_2 24, agenda item_3 26, and agenda item_4 28. Agenda items 20 typically include new topics that need to be discussed, such as may be proper for discussion at periodic meetings, for example. Block diagrams representing issues 30 that have been opened or closed are illustrated, including issue opened_1 32, issue opened_2 34, issue closed_1 36, and issue opened_3 38. Issues typically include those relevant to a common project between disciplines, the need for additional resources, or any number of other pertinent issues of an organization or project.

FIG. 1 thus shows a number of types of communications that typically take place within an organization or project made up of different disciplines or departments. If such reports are generated periodically, the organization could become overloaded with information. According to the invention, these communications are centralized using a tool that can be easily configured to the requirements of individual projects.

The central report 50 is shown at the bottom right of FIG. 1. The central report 50 preferably shows or makes available the status reports 10, the agenda items 20 and the issues 30, both opened and closed. Any number of embodiments of the central report 50 are possible, depending upon the particular desires, needs, and security of the organization. Preferably, however, the central report 50 is a complete representation of the information contained in status reports 10, agenda items 20, and issues 30.

While projects may vary in size, structure, and reporting requirements, projects often call upon individuals to report problems and status to others, often call upon managers to communicate milestones, and often call upon various reports to be generated.

Figure 2:
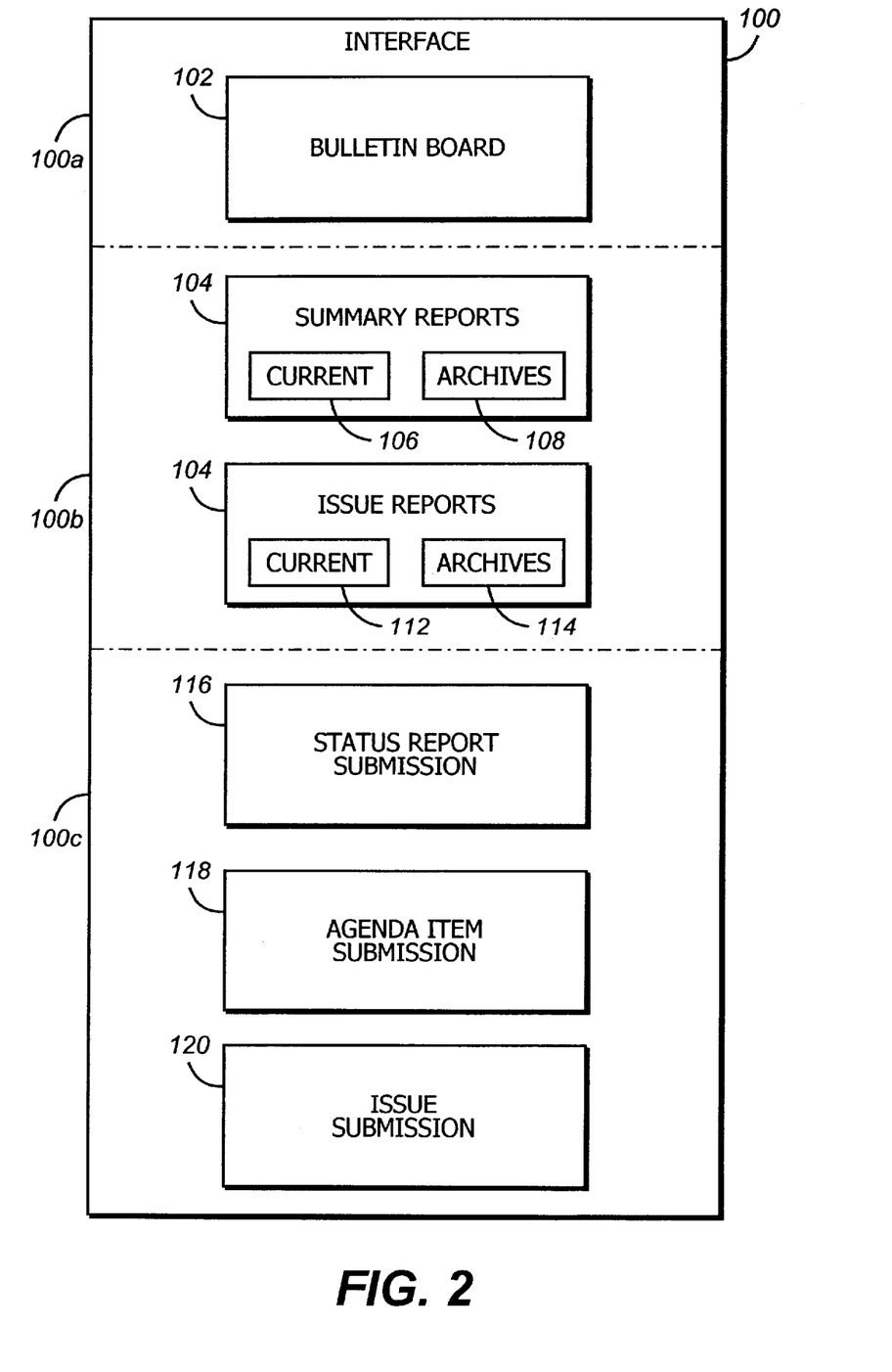
FIG. 2 is a functional block diagram of an interface of the status and issue tracking system according to one embodiment of the present invention.

FIG. 2 is a functional block diagram illustrating certain features of a status and issue tracking system according to the invention. The interface 100 is discussed first as it provides an overview of functionality perceived by a user; the relationship of various other components is then discussed (see FIG. 4). Preferably, an interface 100 is part of a web page that provides features known to those of ordinary skill in web-based design. Such features are illustrated in FIGS. 6–11, below. These portions collectively permit users to submit and retrieve status and issues, and other project information according to the invention.

In one embodiment, the interface 100, or interface, is divided into three parts: a miscellaneous portion 100a, a retrieval section 100b, and a submit section 100c.

The miscellaneous portion 100a includes a bulletin board 102. This feature permits a user to add a link to an arbitrary HTML file to the interface 100. HTML is a coding language that permits text, graphical images, audio, and links to other web pages to co-exist in a single file. The bulletin board is provided to enhance the flexibility of the interface 100. Using this feature, a person within the organization can post arbitrary information that is appropriate for the entire organization to see.

The retrieval section 100b including two sections, a summary reports section 104 and an issue reports section 110. Other reports, not shown, may be provided in this section as well. For example, reports of product deadlines, marketing requirements, board of director meetings, etc., may be relevant to include in this section. Additionally, the summary reports section 104 or the issue reports section 110 can be subdivided by categories: software, CAD design, etc. Other categories would be appropriate to other projects.

In one embodiment, the summary reports section 104 includes status reports from all departments within the organization or project for a given time period, although other embodiments are possible. The summary reports section 104 is discussed further below is in conjunction with the description of FIG. 10. The summary reports section 104 includes current summary reports 106 and archives of summary reports 108. Likewise, an issue reports section 110 includes current issues 112 as well as archives of issues 114. Retrieval of issue reports in the issue reports section 110 is discussed in detail below in conjunction with the discussion of FIG. 11.

Next, the submission section 100c of the interface 100 includes three sections: status report submission 116, agenda item submission 118, and issue submission 120. The status report submission 116 permits each discipline within the organization or project to submit status reports. This can be done on a per time period basis, arbitrarily, or as otherwise desired. Status report submissions 116 are described further in conjunction with the description of FIG. 7, below.

Figure 8:
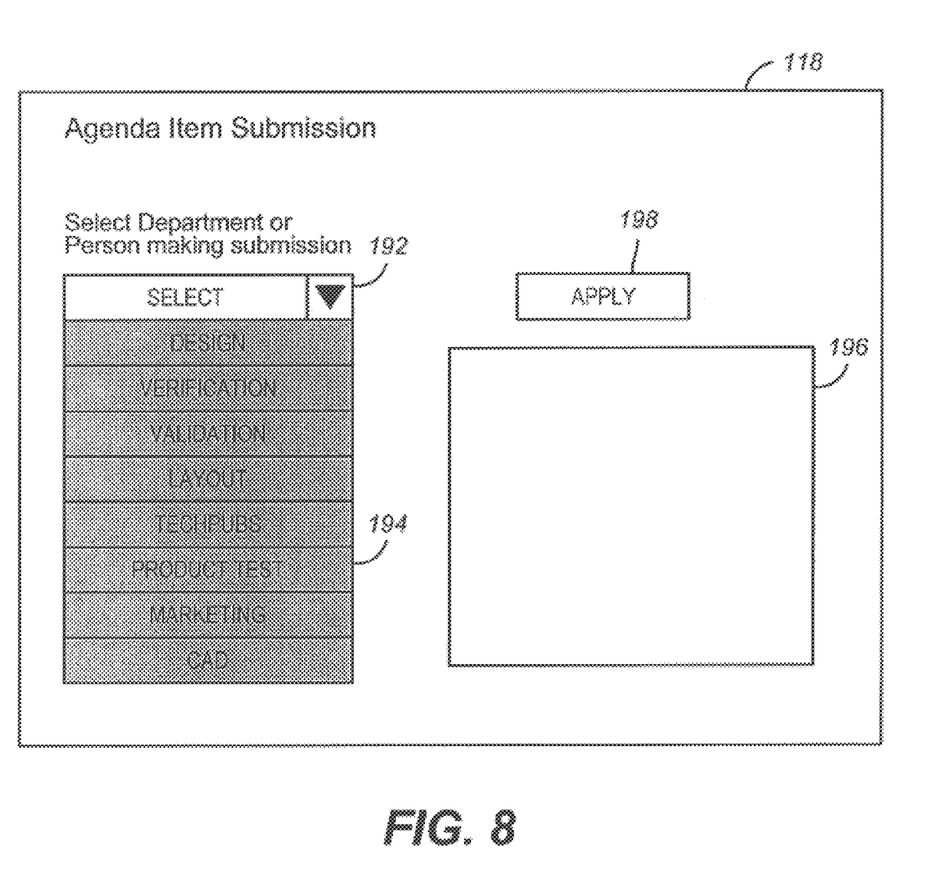
FIG. 8 is a block diagram of the agenda item submission section of the interface shown in FIGS. 2 and 3 of the present invention.

Likewise, agenda item submission 118 permits members of the organization to submit relevant topics for discussion by the organization, at a subsequent meeting, for example. FIG. 8 illustrates agenda item submissions 118 in further detail. Issue submission 120 permits submission of issues, per discipline, per department, per individual, or as otherwise needed, to the interface 100. Issue submissions 120 are discussed more fully in conjunction with the description of FIG. 9, below.

For some organizations or projects, the various functions of the interface 100 may be selectively available to organization members. For example, managers can access status report submission 116, team leaders can access agenda item submission 118, and all organization members can access issue submission 120. Such hierarchical access to different portions of the interface 100 can be tailored to fit the needs of the project or organization.

Thus, the interface 100 facilitates receipt of and submission of communication between members of different disciplines within an organization or project.

Figure 3:
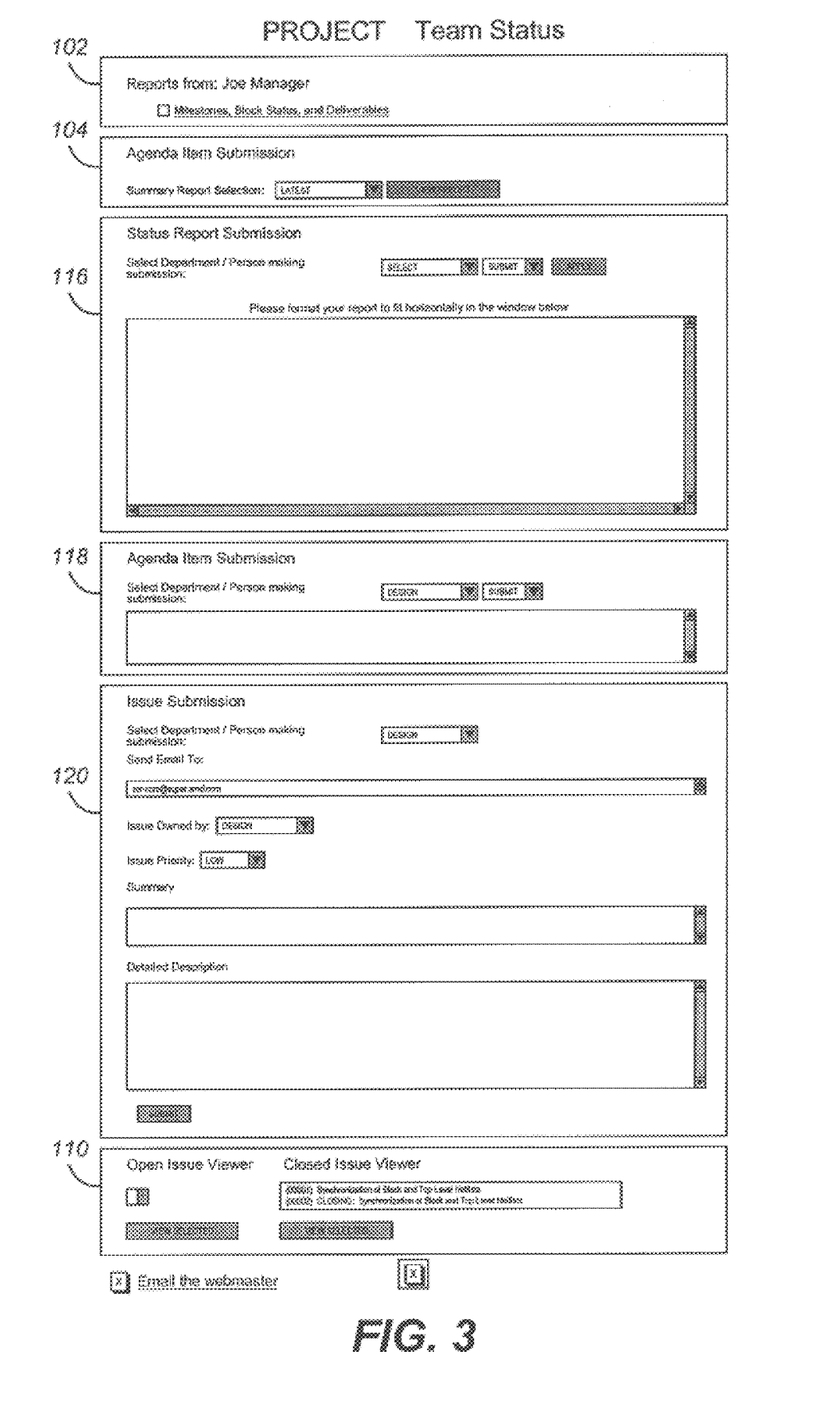
FIG. 3 is a sample interface of one embodiment of the status and issue tracking system.

FIG. 3 shows a sample embodiment of the interface 100 described in the block diagram of FIG. 2. The bulletin board 102, the summary reports 104, issue reports 106, status report submission 116, agenda item submission 118, issue submission 120, and issue retrieval 110 sections are each shown as blocks in FIG. 3.

Generating the interface 100 of FIGS. 2 and 3 is a feature of the SIS program 60 according to the present invention that the user sees directly. However, the SIS program 60 additionally should support this interface 100 with the underlying functionality. First, it responds to submissions made to the interface 100. If a new status report 10 is submitted, for example, the SIS program 60 stores the status report 10 in a database on a network somewhere. Likewise, when a request for an open or closed issue 30 is made to the interface 100, the SIS program 60 retrieves the request from the database. Preferably, the SIS program 60 further provides links between different information blocks, as appropriate.

Figure 4:
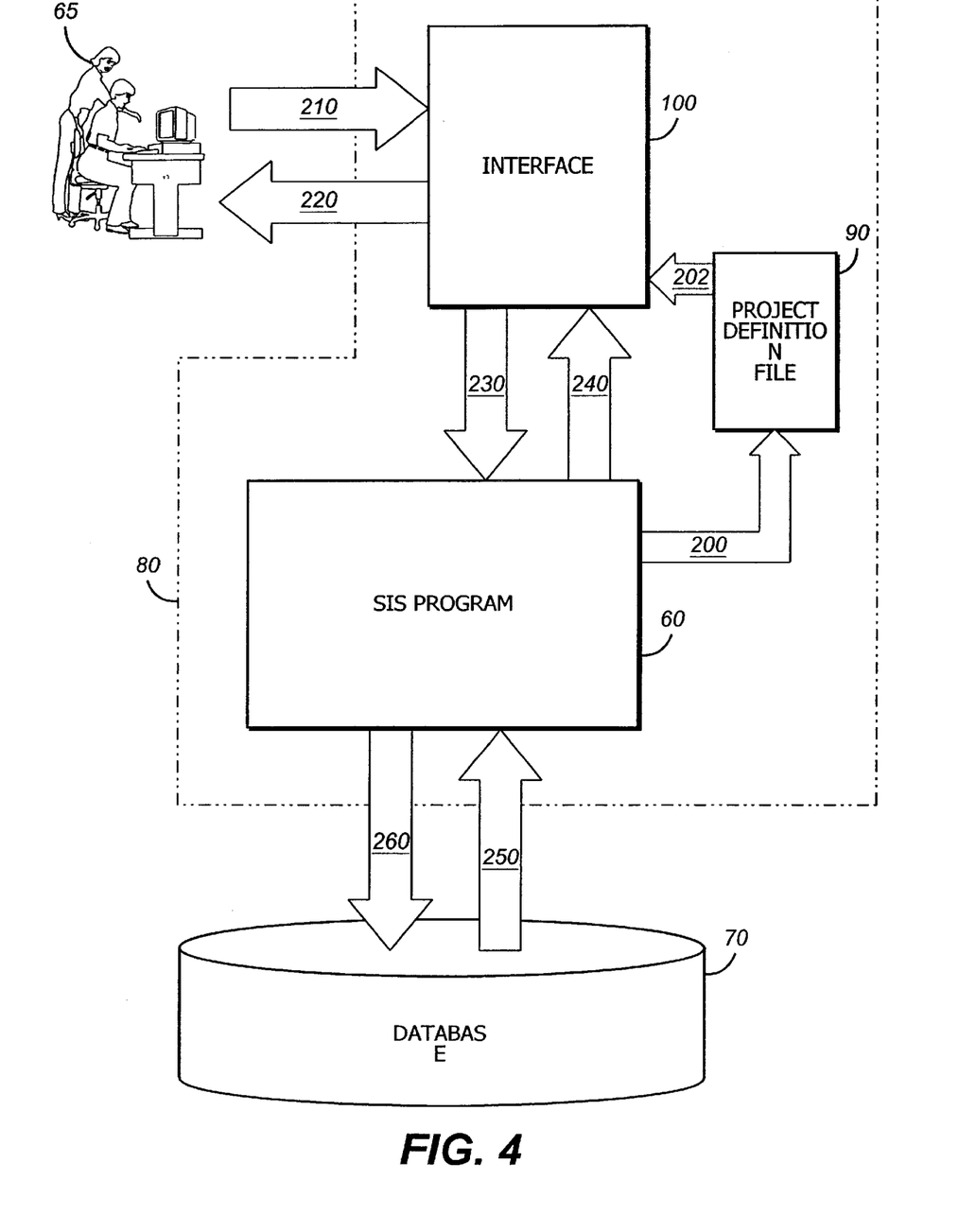
FIG. 4 is a functional block diagram of the features of the SIS program according to the present invention.

FIG. 4 is a functional block diagram of features of the SIS system 80 according to one embodiment. The SIS system 80 is made up of an interface 100, a SIS program 60, and a project definition file 90. Also shown are organization members 65 and a database 70. The block arrows indicate activities or steps taken between these elements. It will be appreciated that the exact components can be varied as can their functionality and location without departing from the spirit of the invention.

First, at step 200, the SIS program 60 generates an interface 100, using the project definition file 90. The project definition file 90 is a file (typically text) that identifies the disciplines or departments that make up the organization or project, the e-mail identification of different members within each discipline, and the functionality for a given project to be supported by the SIS program 60. The project definition file 90 further defines parameters used by the interface 100. These parameters specify available choices to be selected when an organization member 65 submits a new issue, for example. Using the project definition file 90, the SIS program 60 creates an interface 100 at step 202, FIG. 5 shows an example of a project definition file 90 according to one embodiment.

The project definition file 90 is made up of variables which identify elements of the interface 100, locations of files on the database 70, and the functionality of the interface 100 for a given project. The project definition file 90 makes the SIS system 80 very flexible in that, for each new project, by creating a new project definition file 90, a new SIS system 80 for the project results.

Figure 5:
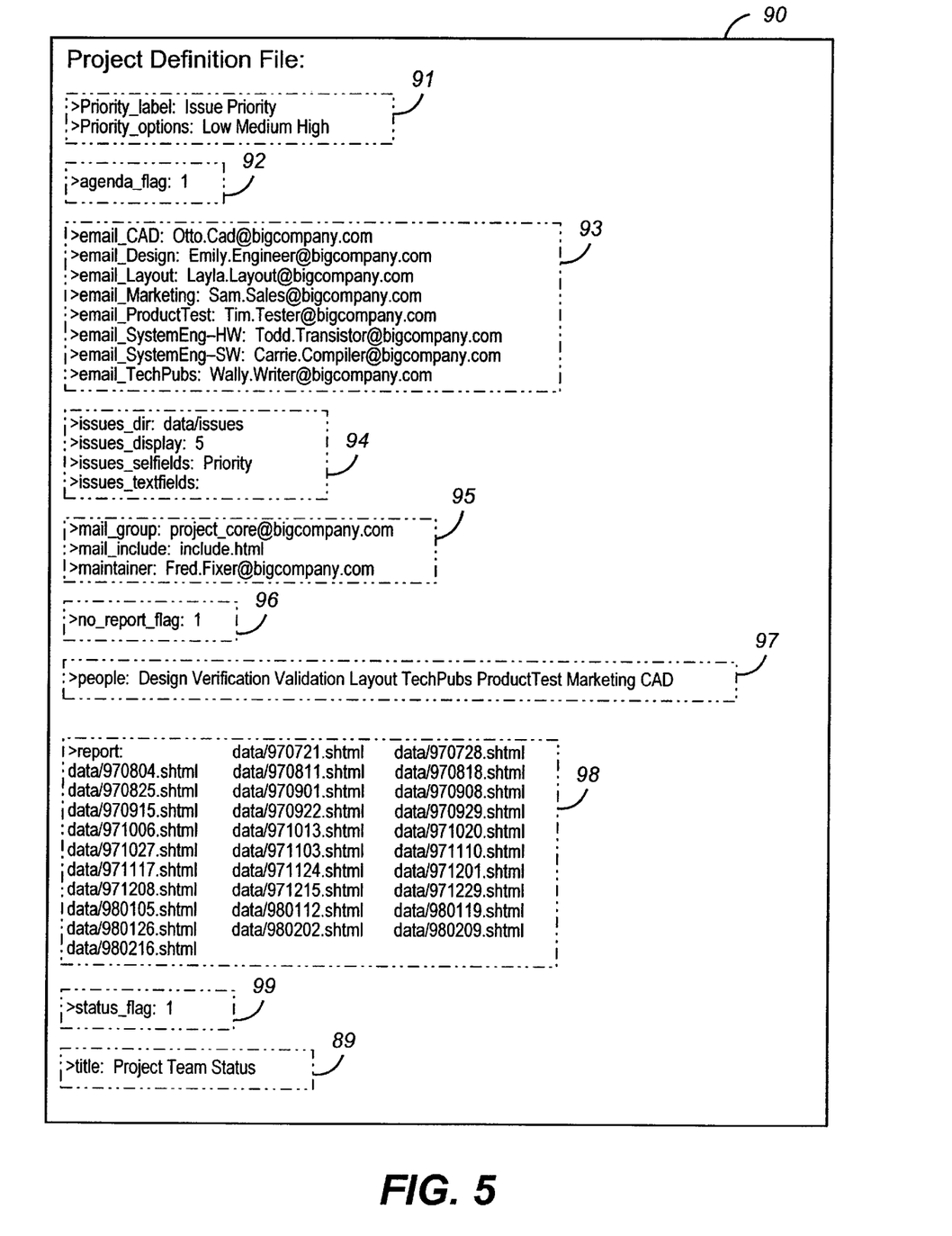
FIG. 5 is a project definition file according to one embodiment.

FIG. 5 shows several blocks representing components or variables of the project definition file 90. Blocks that are involved in creating the interface 100 include the title block 89, which identified the title at the top of the interface 100. Three flag variables, agenda_flag 92 no_report_flag 96, and status_flag 99 are also shown. These flag variables enable functionality predominantly on the interface 90. In one embodiment for example, having the agenda flag 92 set to a '1' results in agenda items being displayed on the interface 100. Other variables associated with the creation of the interface 100 include the priority labels 91 and the issue labels 94.

A second function of the project definition file 90 identifies locations in the database 70 where files may be found. These files include status reports 10, agenda items 20, or issues 30, both current and archival. The report block 98 shows several archival status reports.

Third, the project definition file provides project-specific variables. This part of the project definition file 90 identifies the disciplines or departments, the e-mail addresses of the parties involved, and functionality for a even project. Examples in FIG. 5 include the e-mail block 93, the mail group block 95, and the people block 97. It is to be understood that these blocks can be set up in a number of ways and the SIS system 80 may be practiced with some of these blocks ordered differently or even missing. From the project definition file 90, however, an interface 100 such as those embodied in FIGS. 2 and 3 may result.

The SIS program 60 is the mechanism by which the interface 100 is created using the project definition file 90. The Appendix at the end of this specification shows a sample SIS program 60. In this embodiment, the program is written in the PERL programming language, although the SIS program 60 could be written in any programming language.

The interface 100 generally provides a mechanism for the organization members 65 to view or retrieve information provided by the interface 100, at 220, and to enter information using the interface 100, at 210.

For entries to the interface 100 at 210, the SIS program 60 processes such entries according to their type. For submissions, such as new status reports 10 or issue reports 30 or new agenda items 20, the SIS program 60 sends the information to the database 70 at 260. Typically, the database 70 will be a storage medium on the network, such as a hard disk drive. For retrievals, at 220, such as current or archival status reports 10 and issue reports 30, the SIS program 60 retrieves the report from the database 70 at 250 and updates the interface 100 with the expected information at 240.

As stated before, the interface 100 is typically on a web page. Web pages offer features that facilitate the presentation of large volumes of information. Such features include forms, or graphical user interfaces (GUIs), that allow web page users to "interact" with the web page. Forms often contain buttons, checkboxes, pull-down menus, and fields for entering text.

Figure 6:
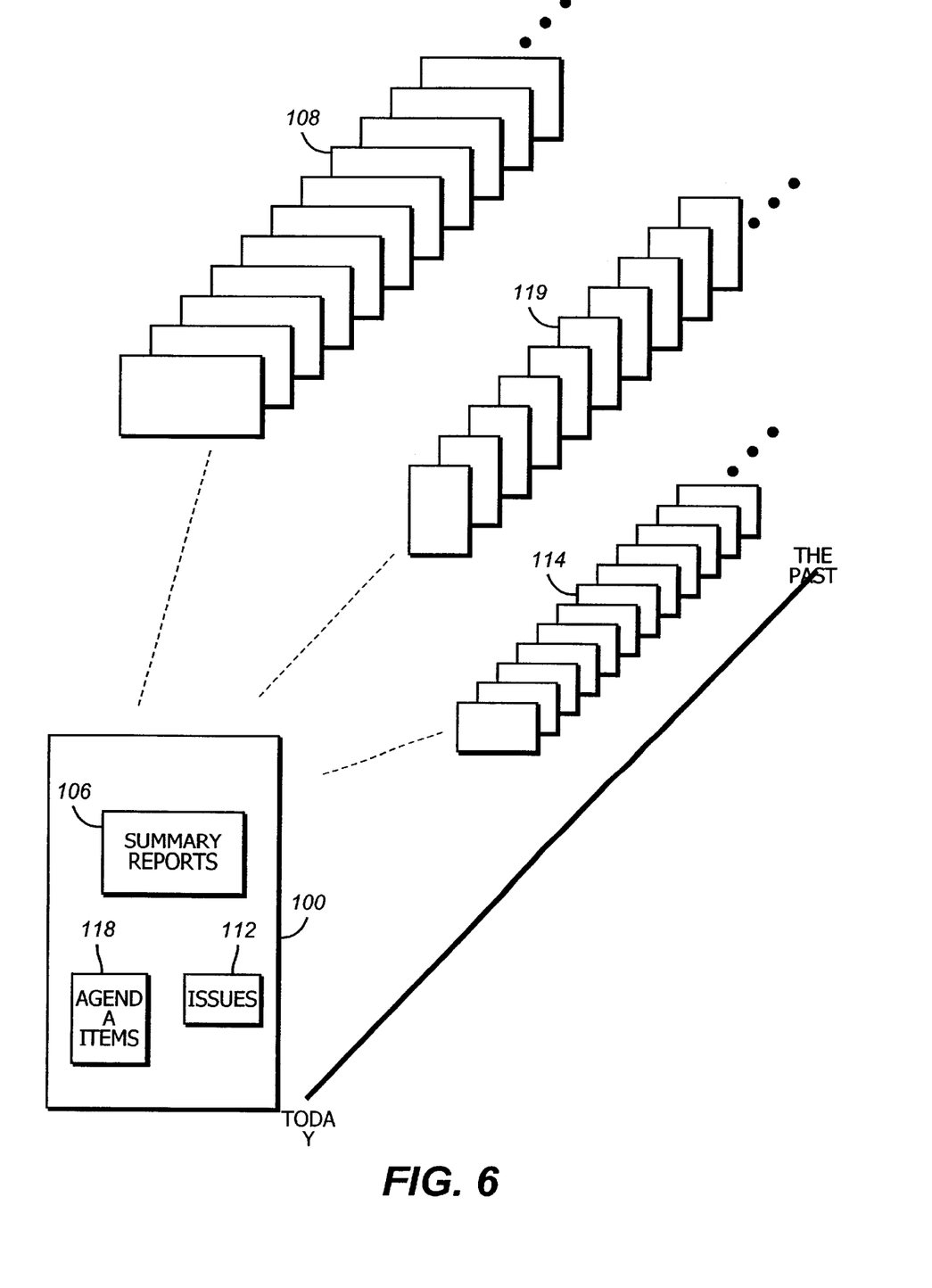
FIG. 6 is an illustration of how hyperlinks expand the information provided by the interface using the SIS program according to the present invention.

Another feature of web pages is the ability to hyperlink, or interconnect, the web page to other web pages that may contain further details about the information which is encapsulated in hypertext. Usually, hypertext is shown in a different color on the web page from surrounding text. By clicking on the hypertext, the web page quickly changes to a different web page, which provides information pertinent to the hypertext itself. Thus, hyperlinks facilitate logical presentation of large volumes of information. FIG. 6 illustrates the presence of archival information "behind" the interface 100. Such archival information is typically made accessible using hyperlinks.

Hyperlinks are also useful when a synopsis or syllabus of information is desired. This enables the web page to accommodate summary needs and detail needs simultaneously. Some organization members may benefit from a detailed account of a communication while others require only a synopsis. When the web page is initially accessed by organization members, therefore, the "first look" at the information provided looks somewhat like a table of contents. Hyperlinks make such presentation possible.

FIG. 6 shows the interface 100 according to one embodiment of the illustrative system. A timeline is shown, with one end of the timeline denoted "today" and the other end of the timeline denoted "the past." By providing hyperlinks to archival information, such as the summary report 108, the agenda item 119, or the issue 114, the organization members 65 of the interface 100 can quickly access a selected item from a large volume of information. Likewise, the organization member 65 is not presented with unneeded archival information on the interface 100, but only with current information and the capability to access archival information. In an alternative embodiment, the current information need not be presented on the interface 100, but can be one of the many available archival selections. Further, more or less recent archival information could be presented on the interface 100, depending on project or user needs.

Figure 7:
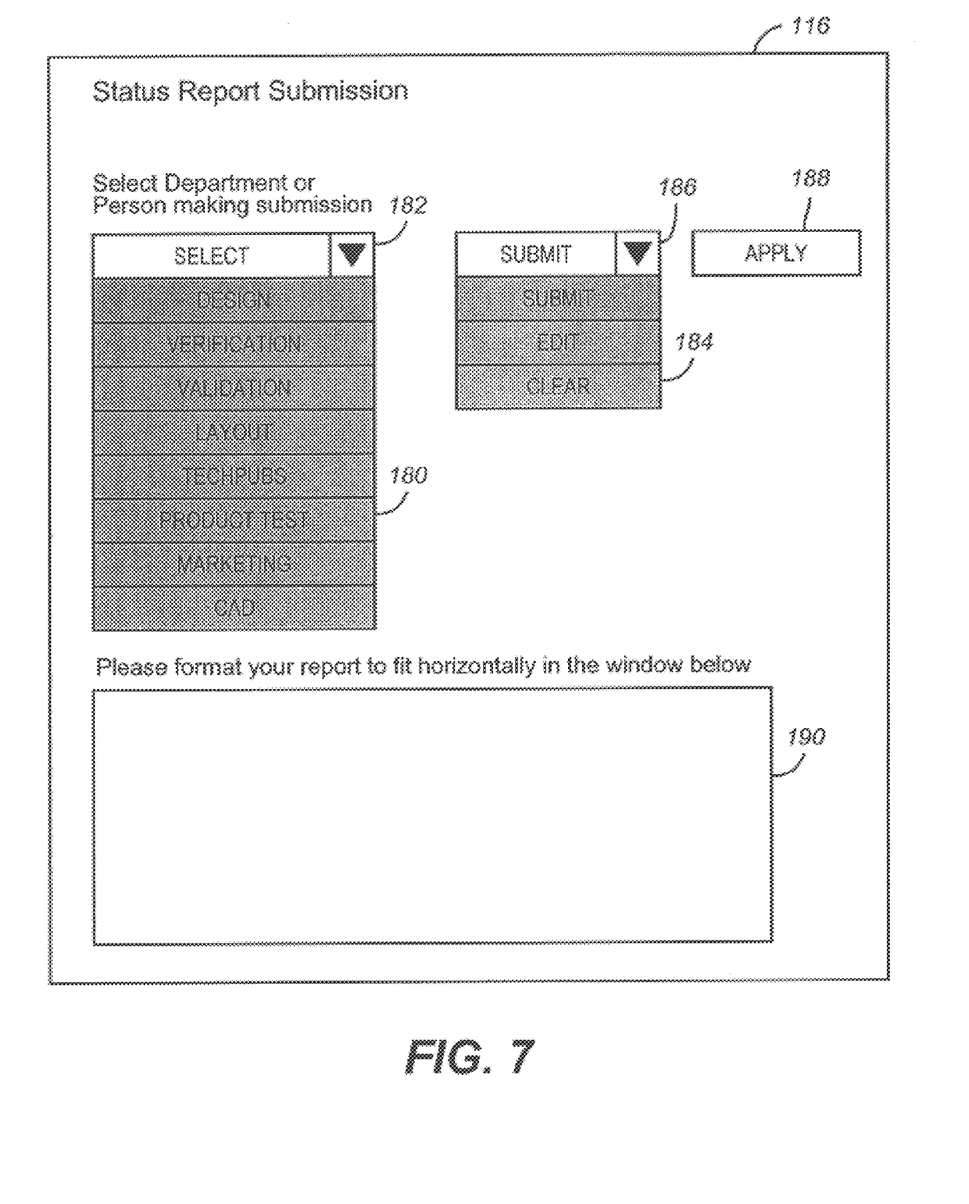
FIG. 7 is a block diagram of the status report submission section of the interface shown in FIGS. 2 and 3 of the present invention.
Figure 9:
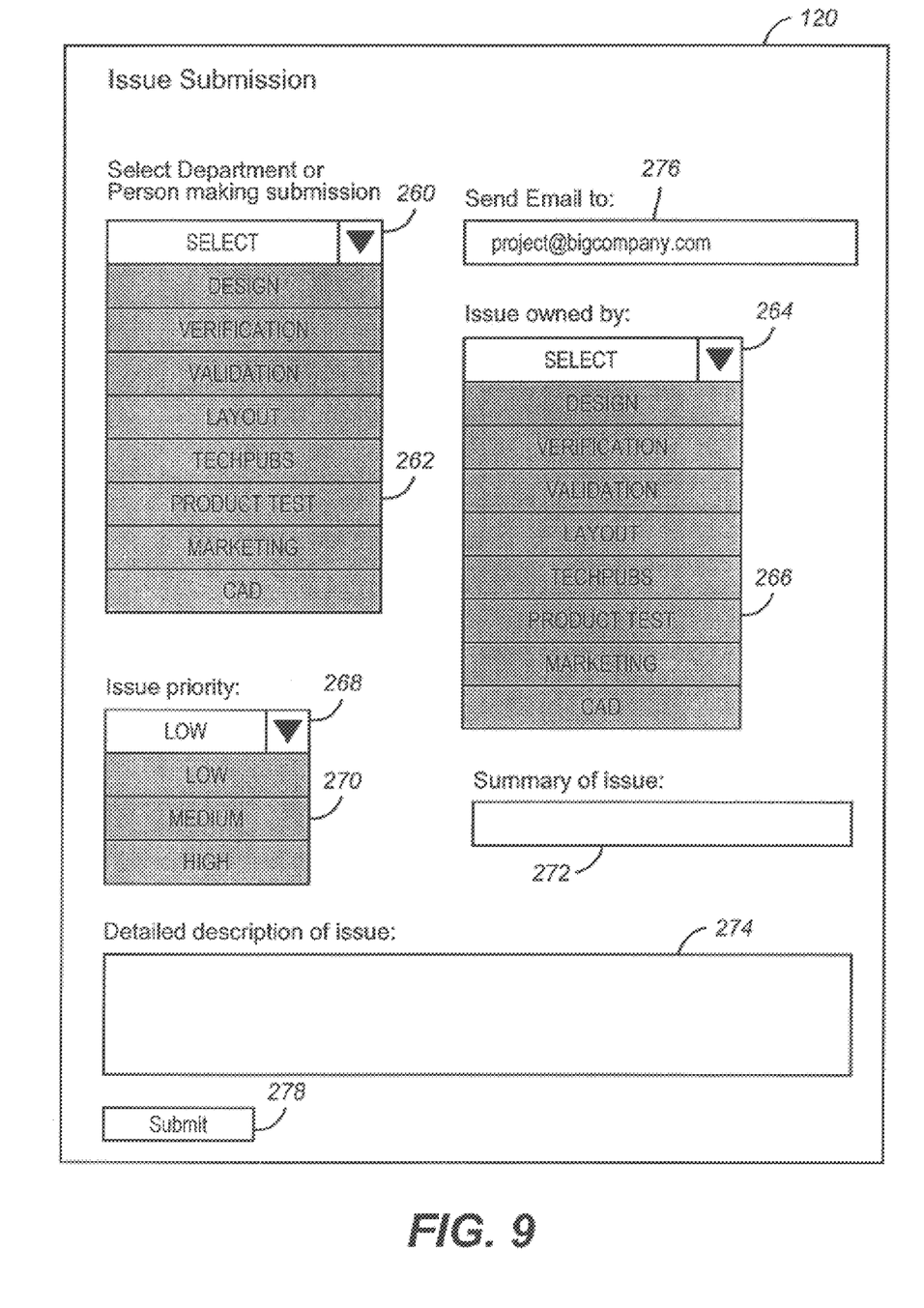
FIG. 9 is a block diagram of the issue submission section of the interface shown in FIGS. 2 and 3 of the present invention.

The next three figures, FIGS. 7, 8, and 9, illustrate in more detail how the various reports of a project are submitted according to one embodiment. It is understood by one skilled in the art that these figures may vary in detail and enhancements may be made without departing from the spirit of the invention.

Each of the figures, status report submission 116 (FIG. 7), agenda item submission 118 (FIG. 8), and issue submission 120 (FIG. 9) is produced, in part, by variables defined in the project definition file 90. For example, in each figure, the available selections under the heading "Select Department or Person Making Submission" result from the "people" variable of FIG. 5 (Block 97) in the project definition file 90. The SIS program 60 uses this variable to generate the resulting submission portions of the interface 100. Although this embodiment shows a single variable being used for all three submission portions, the project definition file 90 may also contain separate variables for each submission portion.

FIG. 7 shows part of the interface 100 for submitting status reports, as shown in FIGS. 2 and 3. In one embodiment, the status report submission 116 is made up of two selection choice boxes 182 and 186. Each selection choice box is a box with a word inside, coupled with a smaller box with a "down arrow" (▼) inside.

When the selection choice box 182 or 186 is initially visible in the status report submissions section 116, only the first selection is visible. Once the organization member 65 clicks the "down arrow" (▼), however, the remaining selection choices become visible as well. The selection choice box 182 or 186 may permit exclusive selection (only one of the multiple choices) or nonexclusive selection (any of the multiple choices) of choices present in the selection choice box 182 or 186, as desired.

In FIG. 7, a "select" selection choice box 182 permits picking one of several different groups as the response to the directive: "select department or person making submission." The available selections are shown as gray-shaded boxes 180: design, verification, validation, layout, tech pubs, product test, marketing, and CAD. Alternatively, the gray-shaded boxes 180 may contain names of persons within a department, or other identifying nomenclature. The selections are designated in the project definition file 90, shown in FIG. 5, and typically varies from project to project.

The presence of these items in the project definition file 90 illustrates an advantageous aspect of a system according to the invention. By embedding such information into such a "parameter" file, a new project, its associated data, interfaces, and relationships can be quickly defined. This allows the software support structure for new projects to quickly go online.

The second selection choice box 186 shown in FIG. 7 is an "action" selection choice box. The selection choice box 186 shows the "submit" action, which is the default action to be taken. Alternatively, the organization member 65 can click on the down arrow to reveal the other "actions," shown in gray-shaded boxes 184: submit, edit, and clear. An "apply" button 188 is also provided, as well as an entry box 190, for submitting alphanumeric text. In one embodiment, HTML code can also be submitted, as desired.

To submit a status report 10, the organization member 65 makes a selection of one of the gray-shaded disciplines 180 from the "select" selection choice box 182. Then, a selection of a proper action must be made from the "action" selection choice box 186. If the "submit" action is selected, the organization member 65 creates an entirely new entry or status report.

Alternatively, the "edit" action may be selected. "Edit" allows the latest entry to be retrieved and permits additional changes to be made. The SIS program 60 retrieves the latest entry and displays it in the the entry box 190. The retrieved status information is in HTML form, in one embodiment.

The "clear" action retrieves the latest entry, again in HTML form, and permits it to be erased entirely. Once the proper "action" selection is made and the entry box 190 is updated as desired, the organization member 65 clicks on the "apply" button 188 to finally enter the status report into the system. The SIS program 60 will then store the status report 10 in database 70. In one embodiment, the SIS program 60 further collects all submitted status reports 10 and prepares a summary report, to be accessible by organization members 65 on interface 100.

FIG. 8 shows part of the interface 100 for submitting agenda items 20, as shown in FIGS. 2 and 3. In one embodiment, the agenda item submission 118 is made up of a single selection choice box 192, for selecting the department or person submitting the agenda item 20. As with FIG. 7, the gray-shaded boxes 194 are the possible choices to be selected.

The entry box 196 is for submitting a description of the agenda item 20 to be submitted. Once the description is complete, the organization member 65 clicks on the "apply" button 198 to finally enter the agenda item 20 into the system. The SIS program 60 then stores the agenda item 20 in database 70. In one embodiment, the SIS program 60 further collects all agenda items 20 and submits them to the interface 100, to be retrieved by the organization members 65.

FIG. 9 shows part of the interface 100 for submitting issue reports 30, as shown in FIGS. 2 and 3. In this embodiment, the issue submission 120 is made up of three single selection choice boxes 260, 264, and 268. The first selection choice box 260 is for selecting the department or person submitting the issue report 30. One of the gray-shaded selections 262 is made by organization member 65 who is submitting a new issue report 30.

The second selection choice box 264 designates who "owns" the issue, as understood by the organization. In this embodiment, the gray-shaded choices 266 are identical to the previous selection choice box 260 choices, but other designations are possible.

The third selection choice box 268 assigns a priority to the issue, based upon some criteria agreed upon by the organization. The priority choices are defined in the project definition file 90, as shown in the priority block 91 of FIG. 5. In this embodiment, low, medium, and high priorities are selectable in the gray-shaded boxes 270. The issue submission 120 further permits an email designed to be assigned in entry box 276. Upon entry of the issue report 20, the SIS program 60 sends an email to the designed as notification of the submission of the issue report 30.

FIG. 9 also shows entry boxes 272 and 274. The first entry box 272 is a summary of the issue. This summary may be used as primary identification when the organization member 65 retrieves an issue report 30. In this embodiment, each issue report 30 is assigned a unique number upon entry. Thus, instead of using the issue summary to retrieve an issue report 30, the issue report 30 can be retrieved by its assigned number. Retrieval of issue reports 30 is discussed more fully in conjunction with the description of FIG. 11, below.

The organization member 65 provides a detailed description of the issue report 30 using entry box 274. Upon completion of all selection and entry boxes, the organization member 65 applies the "submit" button 278 to enter the issue report 30 into the SIS system 80. The SIS program 60 then stores the issue report 30 in database 70. Further, in one embodiment, the SIS program 60 collects all submitted issue reports 30 and lists them on interface 100, for review or retrieval by the organization members 65.

Figure 10:
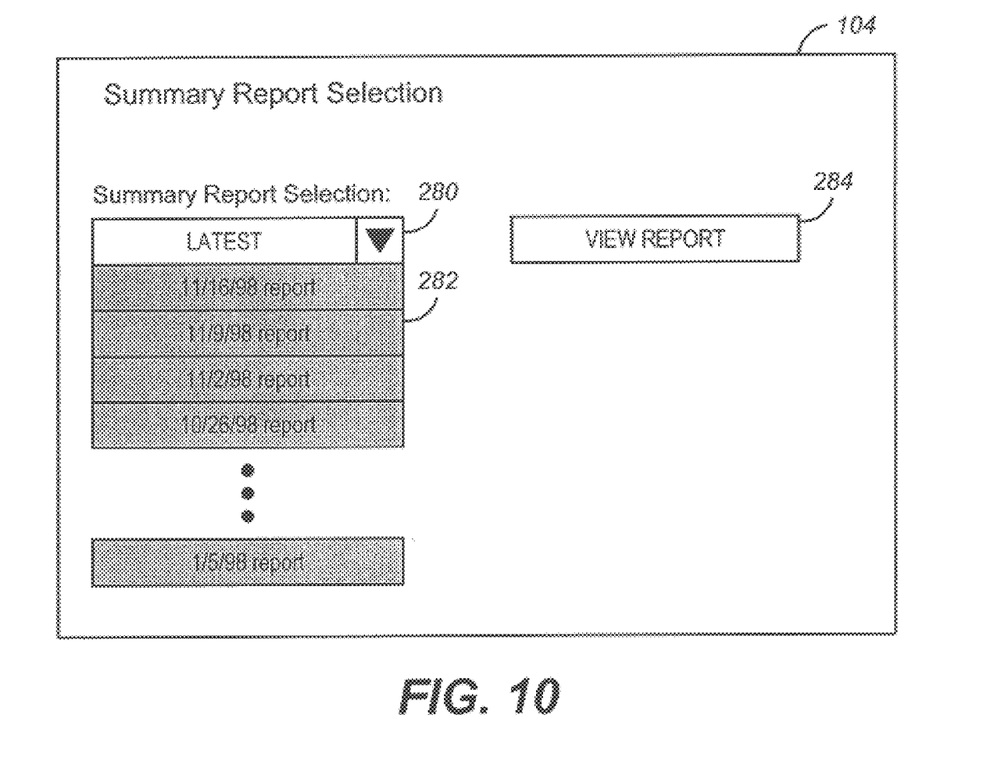
FIG. 10 is a block diagram of the summary report selection section of the interface shown in FIGS. 2 and 3 of the present invention.
Figure 11:
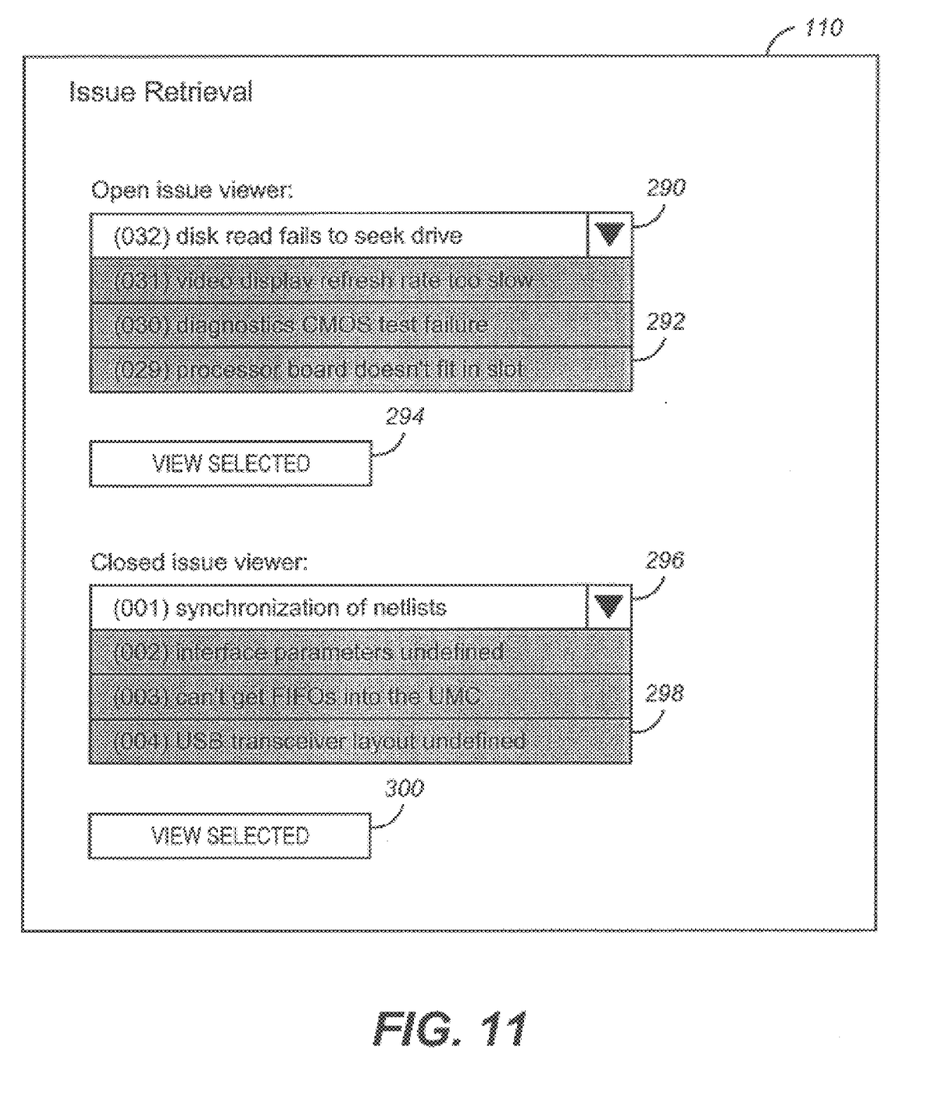
FIG. 11 is a block diagram of the issue retrieval section of the interface shown in FIGS. 2 and 3 of the present invention.

The next two figures, FIGS. 10 and 11, illustrate in more detail how the various reports of a project may be retrieved according to one embodiment. Like the submission examples of FIGS. 7, 8, and 9, summary report selection 104 (FIG. 10) and issue retrieval (FIG. 11) are produced, in part, by variables defined in the project definition file 90. For example, in FIG. 10, the available summary report selections 280 result from the "report" variable of FIG. 5 (block 98) in the project definition file 90. The 313 program 60 uses this variable to generate the resulting available summary report selections 282 in FIG. 10.

FIG. 10 is a block diagram showing the summary report section 104 of the main page 100 of FIGS. 2 and 3. The summary report section 104 is used to retrieve current summary reports 106 or archival summary reports 108 that are stored on database 70 and retrieved by the SIS program 60. The selection choice box 280 permits retrieval of the current summary report 106 by default simply by clicking on the "View Report" button 284. Alternatively, if the organization member 65 clicks on the "down arrow" button of the selection choice box 280, archival summary reports 108, shown as gray-shaded boxes, become visible as alternative selection choices 282.

Once either an archival selection 282 or latest selection is made, the organization member 65 views the summary report 106 or 108 by clicking on the "View Report" button 284. This causes the selected summary report to be retrieved by the SIS program 60.

The summary report 106 or 108 may contain a variety of information, depending upon the needs of the organization. In one embodiment, the summary report includes status reports 10 from each organization, a list of agenda items 20, and a list of open issue reports 30. Links to the issue reports 30, using the hyperlink feature of web-based design, also is provided in one embodiment.

FIG. 11 is a block diagram showing the issue retrieval section 110 of the interface 100 of FIGS. 2 and 3. The issue retrieval section 110 is used to retrieve any of the open or closed issue reports 30 that are stored on database 70 and retrieved by the SIS program 60. The selection choice box 290 permits retrieval of the latest open issue by default, shown as issue #032, simply by clicking on the "View Selected" button 294. Alternatively, if the organization member 65 clicks on the "down arrow" button of selection choice box 290, other open issues, shown as gray-shaded boxes, become visible as alternative selection choices 292.

Likewise, the selection choice box 296 permits retrieval of the oldest closed issue report 30 by default, shown as issue #001, simply by clicking on the "View Selected" button 300. Alternatively, if organization member 65 clicks on the "down arrow" button of selection choice box 296, other closed issue reports 30, shown as gray-shaded boxes, become visible as alternative selection choices 298.

Figure 12:
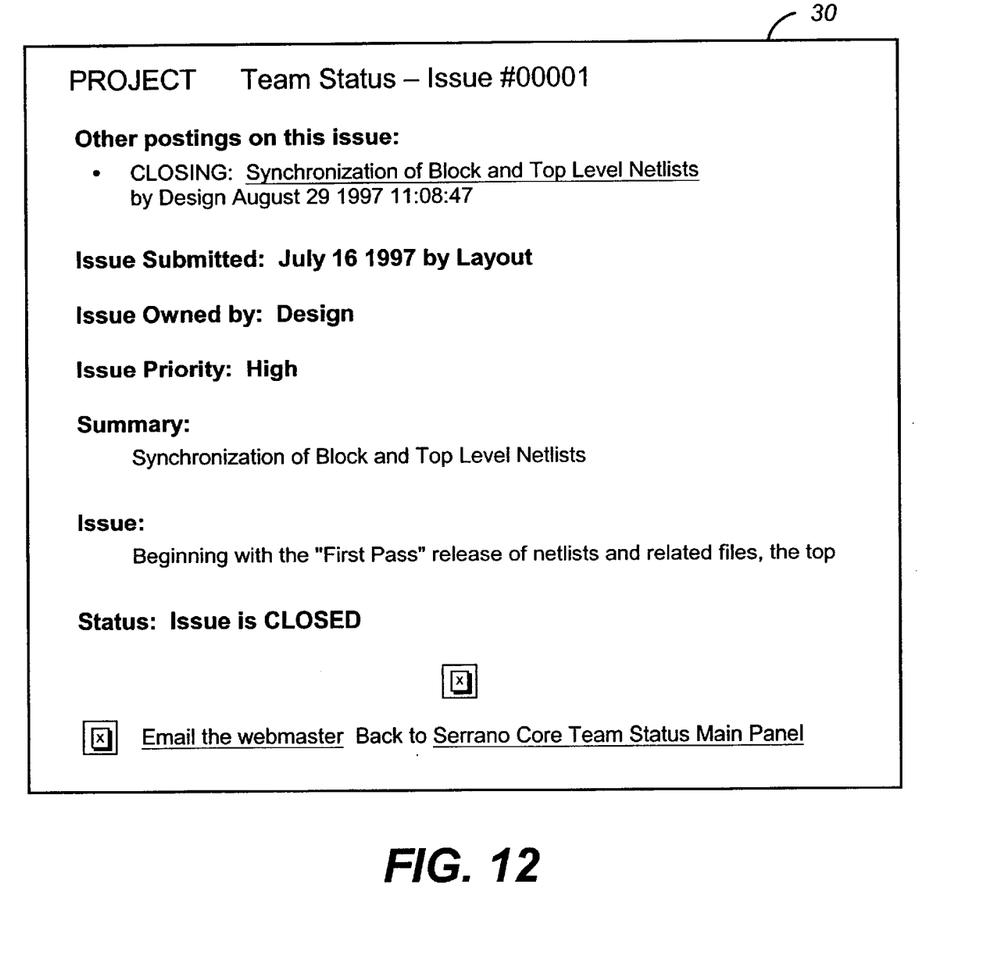
FIG. 12 is a sample screen displayed upon selection of an issue according to one embodiment of the invention.

FIG. 12 shows a sample screen resulting from the selection of an issue report 30 by the organization member 65. In FIG. 12, the displayed issue report 30 is a closed issue, but open issues may be displayed in a similar fashion. Other layouts of retrieval information, both for summary reports 106 and issue reports 30 are possible, and depend largely upon the information needs of the organization.

Thus, the program of the present invention is useful for organizations that are segmented into disciplines between which status and issues need to be communicated. Among its benefits, such a system provides an input/output capability and hyperlinks between different reports that may be relevant to one another. Additionally, using a web page permits a great deal of information to be displayed in a one- to two-page interface and current and archival reports are readily accessible using hyperlinks. Further, because the system is www-based, it is highly accessible virtually anywhere in the world, which benefits organizations which support remote-based disciplines or departments. Also, for each new project within an organization, the SIS program is implemented by simply creating a new project definition file, tailor-made to the requirements of the project.

The foregoing disclosure and description of the invention are illustrative and explanatory thereof. Various changes in the number of report sections, number of parameters, order of steps, field sizes, data types, code elements, code size, connections, components, and materials, as well as in the details of the illustrated hardware and software and construction and method of operation may be made without departing from the spirit of the invention.

We claim:

1. A system for receiving issues from and providing status to members of a project, comprising:

a computer-readable project definition file including definition data defining the organization of the project; and a computer-executable status and information program that maintains project data in a storage database responsive to the organization defined by the project definition file and that provides a user interface to access the project data stored in the storage database, wherein the project data in the storage database is stored and retrieved according to the organization defined by the project definition file, and wherein the user interface receives issues from and provides status to the project members according to the organization defined by the project definition file.

2. The system of claim 1, wherein the project definition file resides on a network server and the status and information program runs on a network workstation.

3. The system of claim 1, wherein the status and information program runs on a network server, and wherein the interface is accessible over the network via a web browser.

4. The system of claim 3, wherein the status and information program and web browser communicate via HTML commands.

5. The system of claim 1, wherein the project definition file defines:

a project title;

a list of project members; and a location of status information and agenda and issue files.

6. The system of claim 1, wherein the project definition file defines the organization of a design team for an integrated circuit device.

7. A computer-based system for receiving issues and providing status to members of a project in response to a computer-readable project definition file, including definition data defining the organization of the project, comprising:

a computer system;

a computer-executable status and information program on the computer system that maintains project data in a storage database responsive to the organization defined by the project definition file and that provides a user interface to access the project data stored in the storage database, wherein the project data in the storage database is stored and retrieved according to the organization defined by the project definition file, and wherein the user interface receives issues and provides status to the project members according to the organization defined by the project definition file.

8. The system of claim 7, wherein the project definition file resides on a network server and the status and information program runs on a network workstation.

9. The system of claim 7, wherein the status and information program runs on a network server, and wherein the interface is accessible over the network via a web browser.

10. The system of claim 9, wherein the status and information program and web browser communicate via HTML commands.

11. The system of claim 7, wherein the project definition file defines:

a project title;

a list of project members; and a location of status information and agenda and issue files.

12. The system of claim 7, wherein the project definition file defines the organization of a design team for an integrated circuit device.

13. A computer-executable status and information program on a machine-readable medium, wherein the status and information program:

maintains project data in a storage database responsive to the organization defined by a project definition file; and provides a user interface to access the project data stored in the storage database, wherein the project data in the storage database is stored and retrieved according to the organization defined by the project definition file.

14. The status and information program of claim 13, wherein the user interface receives issues and provides status to the project members according to the organization defined by the project definition file.

15. A method for collecting and collating information from members of a project, the method comprising the steps of:

providing an interface that is accessible to members for receiving or submitting project data stored in a storage database, wherein the project data in the storage database is stored and retrieved according to the organization defined by the project definition file, and retrieving issue reports and status requests in the interface from the member; and processing the issue reports and status requests according to project definition data in a project definition file defining the organization of the project.

16. The method of claim 15, further comprising the step of:

changing the project definition file for use in a new project.

17. The method of claim 16, wherein the interface is a web page created by a web browser located on a web server.

18. The method of claim 17, wherein the network server is part of a wide-area network, accessible to members of the project.

19. A system for receiving issues from members of a project, comprising:

a computer-readable project definition file including definition data defining the organization of the project; and a computer-executable status and information program that maintains project data in a storage database responsive to the organization defined by the project definition file and that provides a user interface to access the project data stored in the storage database, wherein the project data in the storage database is stored and retrieved according to the organization defined by the project definition file, and wherein the user interface receives issues from and provides status to the project members according to the organization defined by the project definition file.

20. A system for providing status to members of a project, comprising:

a computer-readable project definition file including definition data defining the organization of the project; and a computer-executable status and information program that maintains project data in a storage database responsive to the organization defined by the project definition file and that provides a user interface to access the project data stored in the storage database, wherein the project data in the storage database is stored and retrieved according to the organization defined by the project definition file, and wherein the user interface receives issues from and provides status to the project members according to the organization defined by the project definition file.

* * * * *